United States Patent
Rubin et al.

(10) Patent No.: US 6,735,624 B1
(45) Date of Patent: May 11, 2004

(54) METHOD FOR CONFIGURING AND AUTHENTICATING NEWLY DELIVERED PORTAL DEVICE

(75) Inventors: Andrew E. Rubin, Los Altos, CA (US); Joe Freeman Britt, Jr., Los Gatos, CA (US); Matthew J. Hershenson, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 09/545,701

(22) Filed: Apr. 7, 2000

(51) Int. Cl.[7] .............................................. G06F 13/00
(52) U.S. Cl. ...................... 709/219; 709/218; 709/228; 713/2; 713/200
(58) Field of Search ................................ 709/200, 201, 709/203, 217–219, 227, 228; 345/326, 333, 335; 340/981, 982; 713/156, 200, 2; 707/503

(56) References Cited

U.S. PATENT DOCUMENTS

| | | | |
|---|---|---|---|
| 5,159,592 A | | 10/1992 | Perkins |
| 5,559,800 A | | 9/1996 | Mousseau et al. |
| 5,594,910 A | | 1/1997 | Filepp et al. |
| 5,715,387 A | | 2/1998 | Barnstijn et al. |
| 5,727,159 A | * | 3/1998 | Kikinis ........................ 709/246 |
| 5,727,202 A | | 3/1998 | Kucala |
| 5,778,176 A | * | 7/1998 | Geihs et al. ................. 709/227 |
| 5,790,974 A | | 8/1998 | Tognazzini |
| 5,802,312 A | | 9/1998 | Lazaridis et al. |
| 5,915,095 A | | 6/1999 | Miskowiec |
| 5,961,590 A | | 10/1999 | Mendez et al. |
| 5,964,830 A | * | 10/1999 | Durrett ........................ 709/200 |
| 6,023,708 A | | 2/2000 | Mendez et al. |
| 6,076,109 A | * | 6/2000 | Kikinis ........................ 709/228 |
| 6,151,677 A | * | 11/2000 | Walter et al. ................ 713/183 |
| 6,157,935 A | * | 12/2000 | Tran et al. ................... 707/503 |
| 6,166,734 A | * | 12/2000 | Nahi et al. ................... 345/335 |
| 6,167,441 A | * | 12/2000 | Himmel ....................... 709/217 |
| 6,286,063 B1 | * | 9/2001 | Bolleman et al. ............. 710/62 |
| 6,330,618 B1 | | 12/2001 | Hawkins et al. |
| 6,336,137 B1 | * | 1/2002 | Lee et al. .................... 709/219 |
| 6,396,482 B1 | | 5/2002 | Griffin et al. |
| 6,418,310 B1 | * | 7/2002 | Dent ........................... 345/749 |
| 6,438,601 B1 | * | 8/2002 | Hardy ......................... 709/229 |
| 2002/0007454 A1 | * | 1/2002 | Tarpenning et al. ......... 713/156 |
| 2002/0010757 A1 | * | 1/2002 | Granik et al. ............... 709/218 |

FOREIGN PATENT DOCUMENTS

| | | |
|---|---|---|
| WO | WO 98/36344 | 8/1998 |
| WO | WO 00/30003 | 5/2000 |

OTHER PUBLICATIONS

Anita Komlodi, Gary Marchionini "Key Frame Preview Techniques For Video Browsing" Digital Library Group, College of Library Information Services, University of Maryland p. 118–125.

Excite Home Page, http://www.excite.com/, 1 pg. Aug. 1, 2000.

Ata Vista Home Page, http://www.altavista.com/, 1 pg. Aug. 1, 2000.

Yahoo Home Page, http://www.yahoo.com/, 1 pg. Aug. 1, 2000.

* cited by examiner

*Primary Examiner*—Wen-Tai Lin
(74) *Attorney, Agent, or Firm*—Blakely, Sokoloff, Taylor & Zafman LLP (57) ABSTRACT

A portal device is described comprising: a processor; and a memory for storing instructions which, when executed by the processor, cause the processor to receive data transmitted from a portal server on which a user of the portal device is registered, the data being identified by the user upon registering a user account with the portal server.

10 Claims, 8 Drawing Sheets

METHOD FOR CONFIGURING AND AUTHENTICATING NEWLY DELIVERED PORTAL DEVICE

BACKGROUND OF THE INVENTION

1. Field of the Invention

This invention relates generally to the field of network data services. More particularly, the invention relates to an apparatus and method for managing network portal data.

2. Description of the Related Art

"Portals" are World Wide Web ("WWW") sites which help users manage and navigate through vast amounts of information stored on the Internet. Some well known Internet portals include "Yahoo!®," AltaVista®, and Excite®. Portals typically provide search features which allow users to search for particular types of content by entering keywords. In response to the keyword search request, the portal returns links to relevant Internet sites and/or relevant content stored directly on the portal. For example, if a user enters the keyword "snowboarding," the portal may return a list of hyperlinks to Internet sites related to snowboarding as well as internal portal categories related to snowboarding (e.g., "Recreation>Sports>Snowboarding").

In addition to the keyword search and content management capabilities described above, portals may also provide users with a variety of network applications such as, for example, email, electronic scheduling and contact management, chat groups, newsgroups, personal financing, and instant messaging, to name just a few.

Many portals also provide a registration feature which allows users to customize the types of information and/or applications which will be immediately accessible to the user on the portal. For example, the user may configure the portal to automatically retrieve and display information specified by the user such as, for example, the value of the user's stock portfolio, the weather forecast in the user's geographic location, an indication of any unread email messages, the user's appointments for the day, the local news headlines for the day, and/or the television listings for the user's favorite channels that evening.

When the user visits the portal (e.g., via a client computer), he/she may be presented with a single Web page that contains all of the foregoing information, automatically collected and transmitted by the portal. Typically, a portal will transmit a unique Web page and associated data to the user in this manner only after receiving proper authentication (e.g., user ID and password).

SUMMARY OF THE INVENTION

A method is described, comprising: searching for portable device software configured on a client; automatically installing the portable device software if the portable device software is not configured on the client; searching for a portable device attached to the client; and logging in a user of the portable device upon identifying the portable device.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
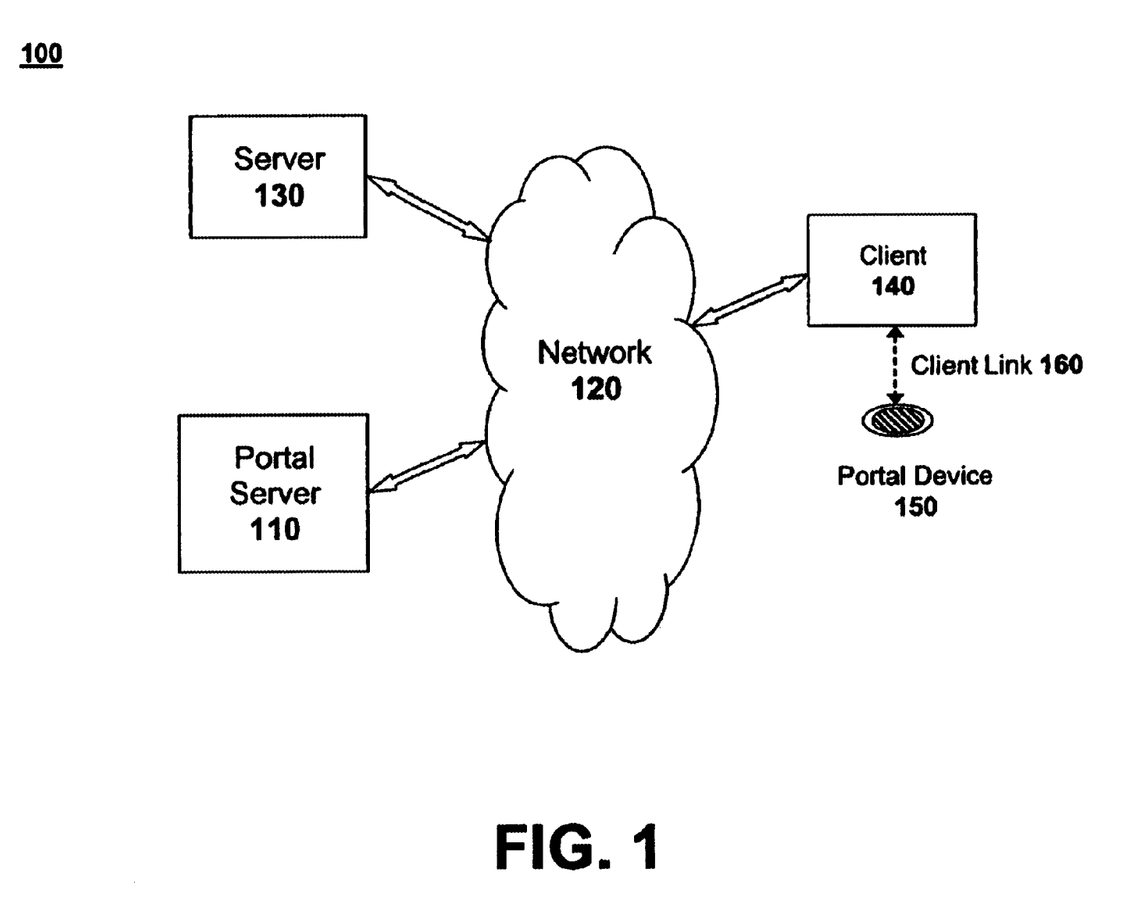
FIG. 1 illustrates an exemplary network architecture used to implement elements of the present invention.

Elements of the present invention may be included within a client-server based architecture 100 such as that illustrated in FIG. 1. According to the embodiment depicted in FIG. 1, a portal server 110 communicates with clients 140 and other network servers 130 over a network 120 (e.g., the Internet). The network 120 over which the clients 140 and servers 110, 130 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 120 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 110 in one embodiment includes a user database for storing various types of user configuration and account data. Users may register and login to the portal server 110 from a client 140 by specifying a user ID and/or password. According to one embodiment, a user connects to the servers 110, 130 via a browser application such as Netscape Navigator™ or Microsoft Internet Explorer™ which communicates via the Hypertext Transfer Protocol (hereinafter "HTTP").

In one embodiment, users may configure the portal server 110 to retrieve and manage specific types of information. For example, a user may configure the portal server 110 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 130) on behalf of the user.

In addition to information retrieval and management, in one embodiment the portal server 110 also provides application services such as email, online scheduling (e.g., appointments, to-do lists, etc), instant messaging, contact management, word processing and a variety of other online services. Users may access these services by logging in to the portal server 110 with a valid user ID and password. In one embodiment, the portal server 110 generates a unique, personalized Web page for each user containing links to all, or a subset of, the information and/or services subscribed to by the user.

EMBODIMENTS OF THE INVENTION

Figure 2:
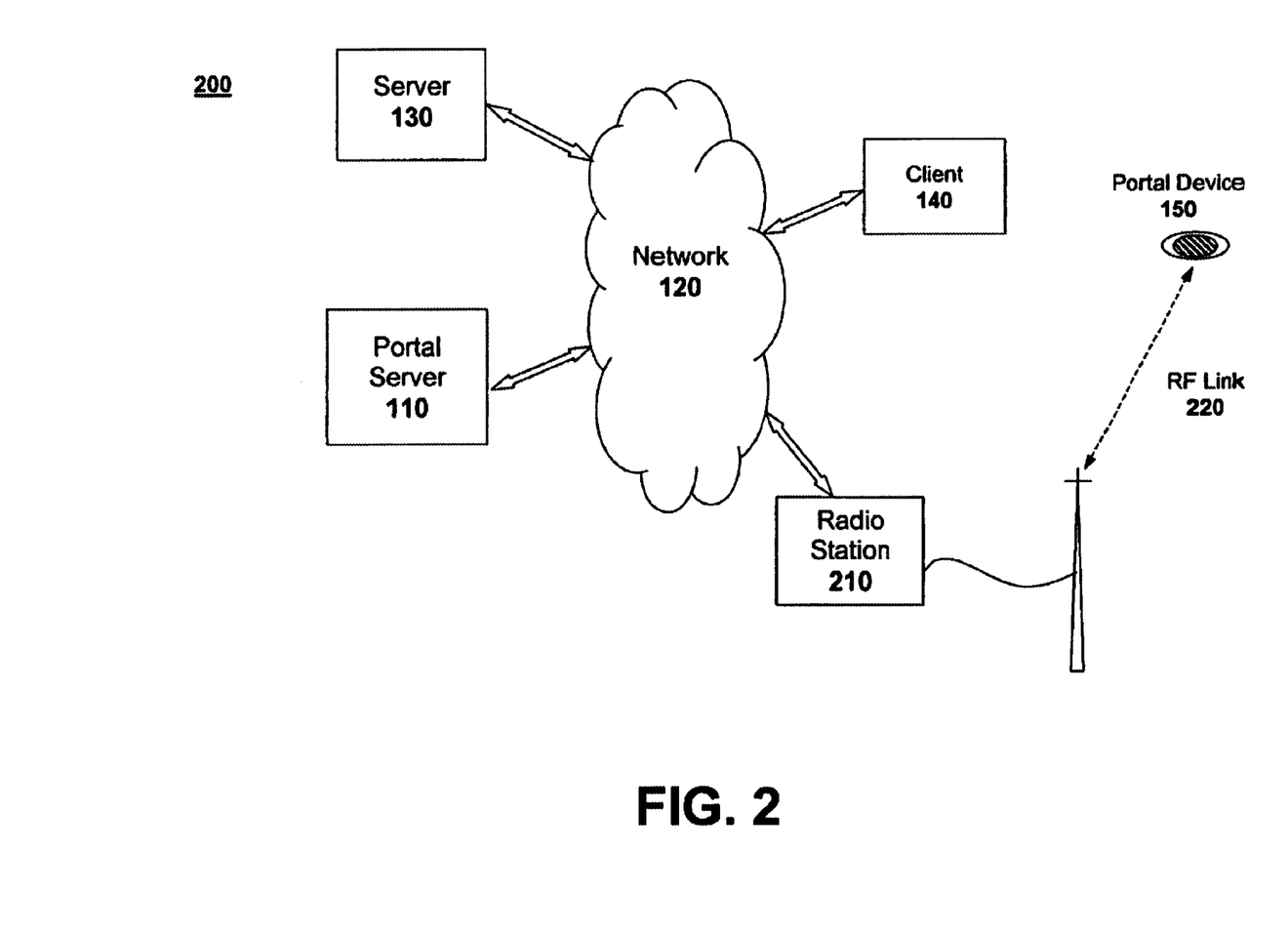
FIG. 2 illustrates another exemplary network architecture used to implement elements of the present invention.

In one embodiment, a portal device 150 stores and processes user-specified information and/or programs as well as non-user-specified information/programs (e.g., targeted advertisements based on the user's profile). The information/programs may be transmitted to the portal device 150 through the client 140, and/or directly via wireless broadcast (as illustrated in FIG. 2 and described in detail below). Thus, the portal device 150 in this embodiment is a removable extension of the portal server 110, storing a subset of the information and services maintained by the portal server 110 on behalf of the user. For example, a user may configure the portal server 110 to periodically download the user's to-do list (or other scheduling data) to the portal device (e.g., every morning, every two hours, every time the user connects the portal device to the client 140, etc). When the user leaves the office, he/she can simply take the portal device with him/her and view his/her schedule throughout the day.

The timing of the information/program download may depend on the particular embodiment of the portal device 150. For example, if a wireless embodiment is used (described below) downloads may occur at any time when the portal device 150 is within wireless transmission range, whereas if a non-wireless embodiment is used, downloads may be limited to periods of time when the portal device 150 is connected to the portal server 110.

In one embodiment, the user may customize the portal device 150 preferences and content which will be downloaded to the portal device 150 from the portal server 110. This may be accomplished, for example, by selecting certain preferences/content from a portal server 110 Web page (e.g., by using an online programming interface as described below). For example, the user may choose to have each day's to-do list downloaded to his portal device 150 and may also program the device 150 (e.g., via the portal server 110) to continually display the next scheduled event for the day. Various other user interface and content-based data may be transmitted to the portal device 150 from the portal server 110 while still complying with the underlying principles of the invention.

Client Link

As illustrated in FIG. 1, one embodiment of the portal device 150 communicates to the portal server 110 via a communication link 160 with the client 140. The communication link may be established via a physical I/O connection with the client 140 such as a Universal Serial Bus ("USB") interface or a communication ("serial") interface. Alternatively, the communication link 160 may be a wireless link such as an Infrared I/O channel or a radio frequency ("RF") I/O channel.

In one particular embodiment, the client link 160 is formed using a capacitively-coupled communication channel. As is known in the art, a capacitor is any dielectric sandwiched between two conductive elements. In this embodiment, one of the two conductive elements is located within the portal device 150 and the second of the two conductive elements is located external to the portal device 150 and is communicatively coupled to an I/O port of the client 140. For example, in one embodiment, the second conductive element may be disposed within user's mouse pad. According to this embodiment, the user may simply place the portal device on the mouse pad to set up the capacitive communication link 160 with the client 140. It should be noted, however, that various other client links 160 may be employed while still complying with the underlying principles of the invention.

Direct Radio Broadcast

In one embodiment, illustrated in FIG. 2, data and/or programs are transmitted to the portal device 150 from the portal server 110 over an RF link 220. In this embodiment, the organization maintaining the portal server 110 and/or implementing other features of the system and method described herein (hereinafter the "portal organization" or "PO"), may lease a portion of the RF transmission bandwidth from one or more radio stations 210. It should be noted, however, that various RF transmission techniques may be used without departing from the underlying principles of the invention.

Figure 3:
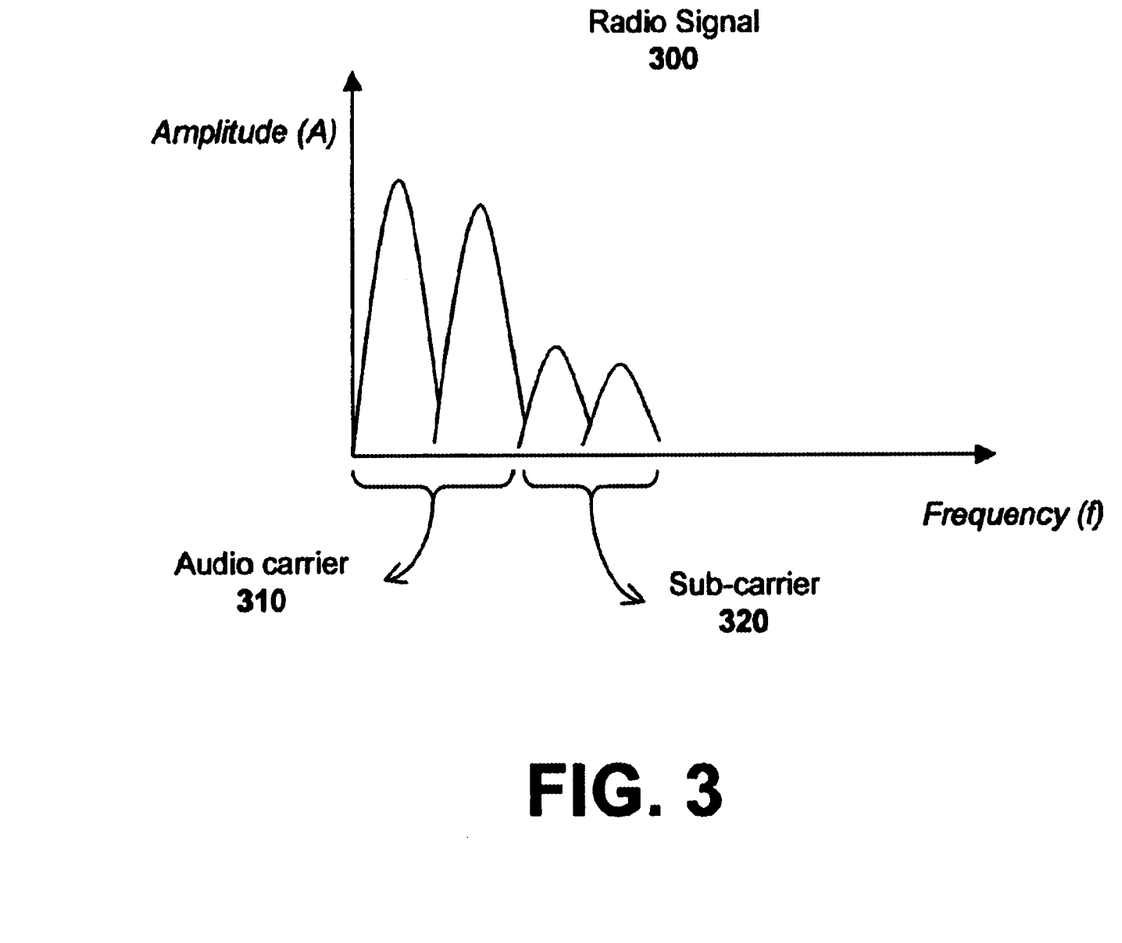
FIG. 3 illustrates a radio signal including its sub-carrier in the frequency domain.

Referring to FIG. 3, in one particular embodiment, the PO will use the radio station's sub-carrier frequency band 320 to transmit data and/or programs to the portal device 150. As it is known in the art, radio stations are licensed a sub-carrier frequency block 320 along with the audio carrier frequency block 310. Although some radio stations use the sub-carrier frequency block 320 (e.g., for foreign-language broadcast), most do not. As such, the present embodiment provides a mechanism for transmitting data over an infrequently-used wireless transmission channel.

To further conserve bandwidth within the sub-carrier frequency block 320, in one embodiment, the data transmitted over the RF link 220 is not addressed to any one specific portal device. Rather, in this embodiment, the data is simply transmitted (e.g., with a tag that identifies the data) and is sensed by any portal device(s) 150 listening within the sub-carrier block 320. This type of addressing will be referred to herein as "data addressable" addressing (in contrast to "device addressable addressing in which a device address is associated with the transmitted data). The individual portal devices 150 that sense the various data transmissions may ignore them or may take some other specified action (e.g., store and display the transmitted data), depending on how the devices 150 are configured. For example, a portal device 150 may be configured by a user to track stock quotes for stocks within his/her portfolio and to ignore all other stock quotes. Similarly, the user may configure the portal device 150 to listen for local weather reports, local news headlines, and/or any other information which may be accessed by the user directly at the portal server 110.

In one embodiment, the data broadcast in a particular geographical region will be selected based on the number of users in that region who have registered on the portal server 110 and/or the types of data requested by users in the region. For example, if no users in the region have configured the portal server 110 to gather a particular stock quote, then the portal server 110 will not transmit that stock quote over the RF link 220 in that region. Similarly, the portal server 110 may be configured to only transmit local data such as weather and local news in the local broadcast region to which the weather and news pertains (i.e., where it will most likely be requested). Broadcasting data selectively in this manner will further improve bandwidth over the RF link 220 (i.e., by reducing unnecessary data transmissions).

In one embodiment, portal devices 150 may be addressed directly (e.g., by including the device's serial number or other ID code in an address field of the data transmission). This embodiment may be provided by the PO to users as a "premium" service, under which the user pays an additional fee to receive personally-addressed information over the sub-carrier 360 (e.g., email messages, daily schedules, etc), as well as the more general information described above. Users of this embodiment may be charged on a subscription basis and/or on a per-use basis, depending on the embodiment. Of course, other pricing models may be employed while still complying with the underlying concept. The PO may also employ this embodiment under certain emergency situations (e.g., where it is crucial that a particular user receive a data transmission immediately).

Embodiments of the Portal Device

Figure 4:
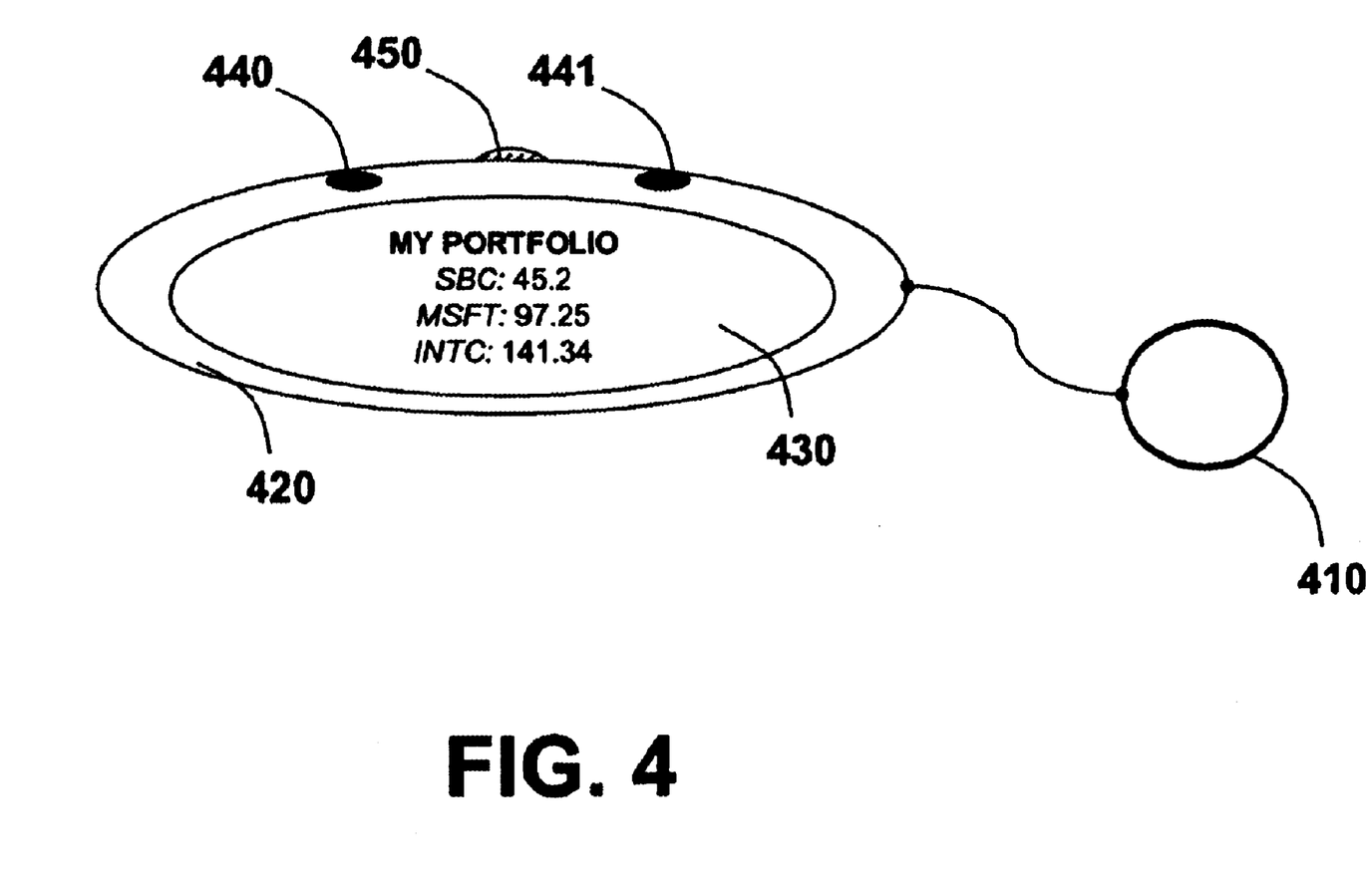
FIG. 4 illustrates an external view of a portal device according to one embodiment of the invention.

FIG. 4 illustrates an external view of one embodiment of a portal device 420 which may be used as a key chain. As shown, this embodiment includes a key chain ring 410 for securing a set of keys (or other personal effects) to the device 420. Also illustrated is a display 430 for displaying various types of portal data. In one embodiment the display is a Liquid Crystal Display ("LCD"). Of course, other display technologies may be implemented while still complying with the underlying principles of the invention (e.g., Light Emitting Diode ("LED") displays). Also included is a set of control buttons 440 and 441 for selecting menu items and/or jumping back and forth between stored portal data and a control knob 450 for scrolling between menu items and/or data. In one embodiment, the control knob 450 rotates on an axis which is substantially perpendicular to the plane of the display 430.

Additional attachable embodiments of the portal device 150 include a necklace configuration, a pocket watch configuration, and a sports configuration (e.g., wherein the portal device is strapped firmly around a user's arm). In the latter configuration, the shell of the portal device may be comprised of a water-proof material to avoid water damage to the internal components of the device.

Figure 5:
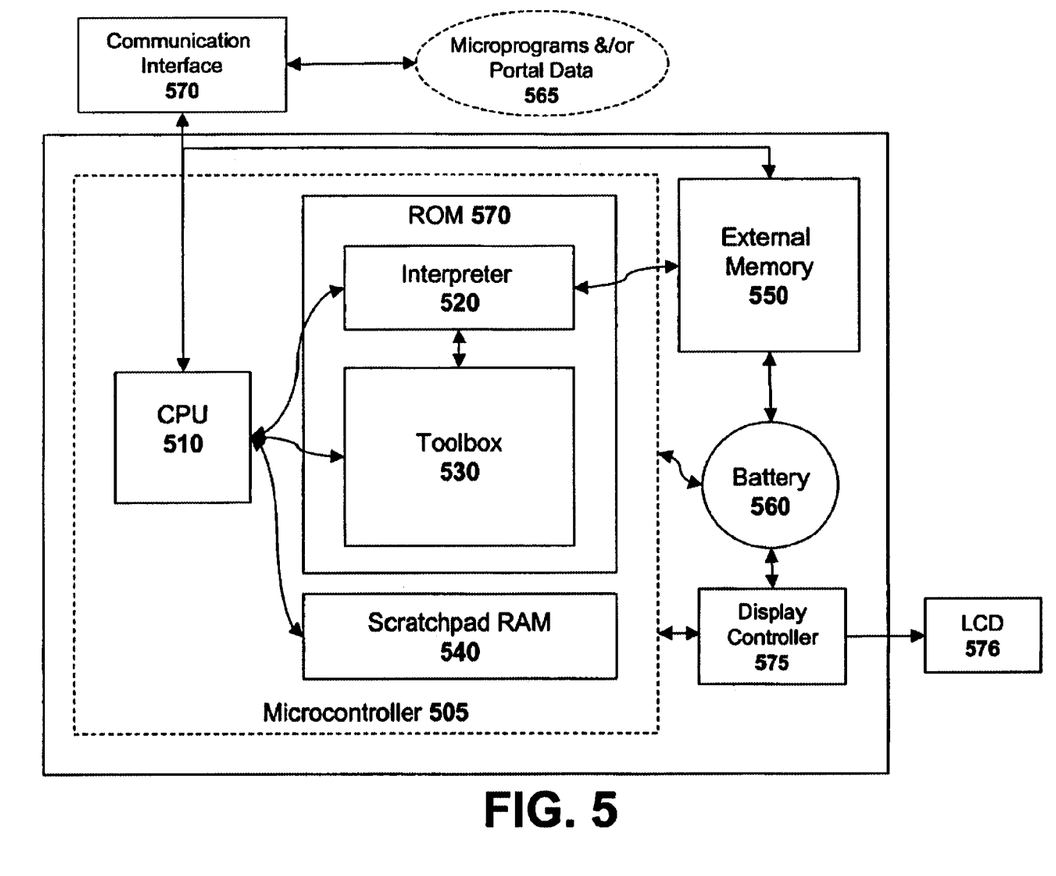
FIG. 5 illustrates an internal view of a portal device according to one embodiment of the invention.

As illustrated in FIG. 5, one embodiment of the portal device 150 is comprised generally of a microcontroller 505, an external memory 550, a display controller 575, and a battery 560. The external memory 550 may be used to store programs and/or portal data 565 transmitted to the portal device 150 from the portal server 110 (e.g., via client 140 and/or radio station 210). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the portal device 150 will notify the user and/or the portal server 110. The portal server 110 in one embodiment will then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the portal device 150. These routines include drawing text and graphics on the portal device's display 430, decompressing data transmitted from the portal server 110, reproducing audio on the portal device 150, and performing various input/output and communication functions (e.g., transmitting/receiving data over the client link 160 and/or the RF link 220). A variety of additional portal device functions may be included within the toolbox 530 while still complying with the underlying principles of the invention.

In one embodiment, microprograms and portal data 560 are transmitted from the portal server 110 to the external memory 550 of the portal device via a communication interface 570 under control of the CPU 510. Various communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the portal device 150 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows portal devices 150 with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 may be comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Data Compression

As described above, microprograms and portal data may be transmitted to the portal device 150 in a compressed format. As such, in one embodiment, decompression logic is programmed into the microcontroller ROM 570 (e.g., within the toolbox 530) and is used to interpret and/or decompress the microprograms/data as they are received.

In one embodiment, a plurality of uncompressed data is stored in the ROM 570, and codes identifying the uncompressed data are transmitted across the RF link 220 and/or client link 160. For example, instead of transmitting the entire market code for a particular stock, such as "MSFT" for Microsoft, a compressed code, e.g., "M," may be transmitted to the portal device 150 instead. The ROM 570 in this embodiment may include a lookup table (or similar decode logic) for retrieving the real market code "MSFT," using the compressed code, "M." Once the real code is retrieved from the ROM 570, it may be displayed on the portal device 150 as illustrated in FIG. 4. It should be noted, however, that the underlying principles of the invention may be practiced using a variety of coding schemes and/or digital compression techniques.

User Registration and Authentication

Figure 6:
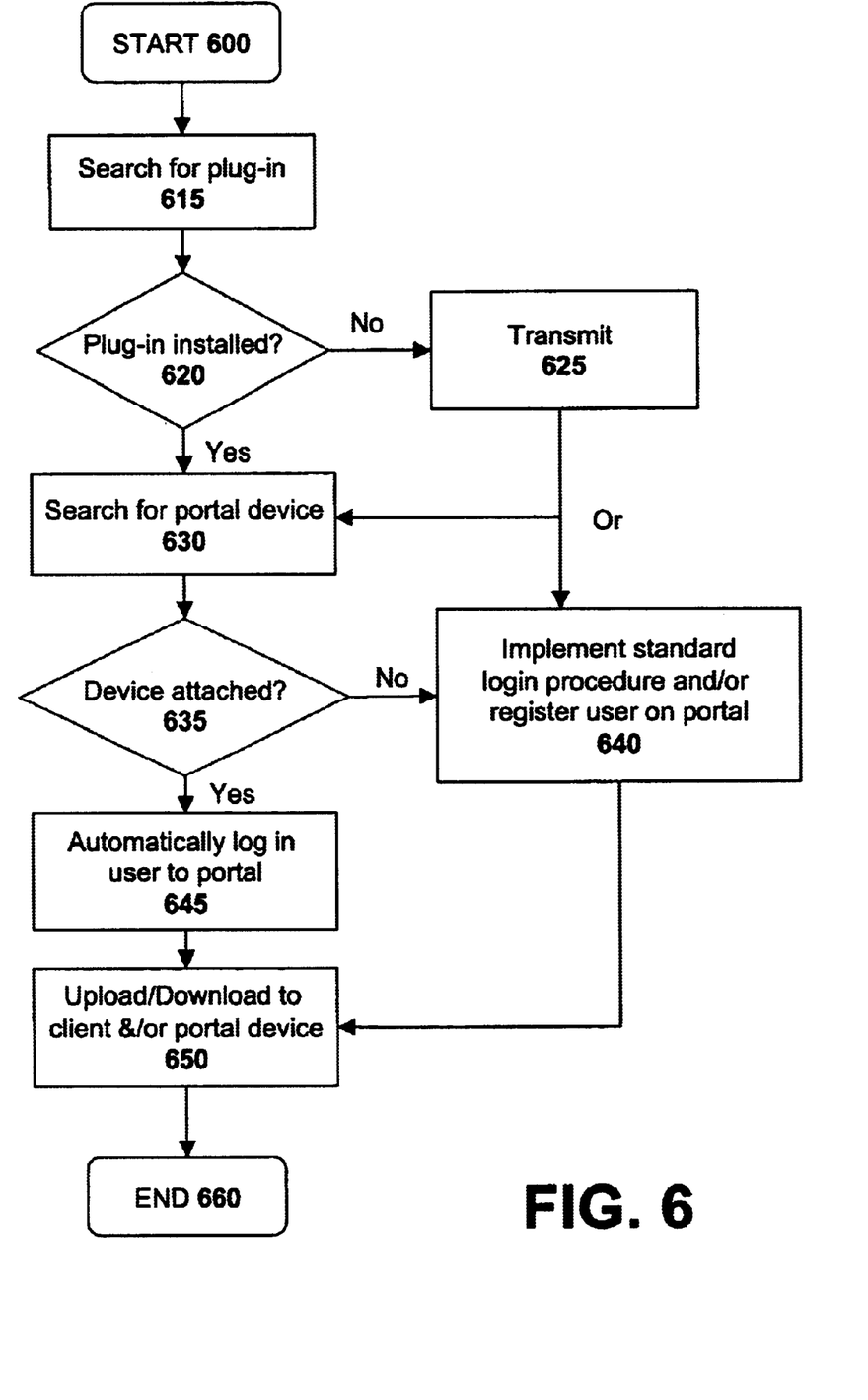
FIG. 6 illustrates a process according to one embodiment of the invention wherein a user is logged in to a portal server.

One embodiment of the invention will now be described with reference to the flowchart of FIG. 6. According to this embodiment, when a user initially connects to the portal server 110 (e.g., from client 140), the portal server 110 will determine whether a portal device plug-in is installed on the user's Web browser (at 615). As is known in the art, plug-ins are auxiliary programs added to Web browsers to provide them with new levels of functionality. One embodiment of the present invention uses a plug-in to coordinate communication between the portal server 110, the client 140, and the portal device 150. In addition, the plug-in may convert and/or compress "standard" portal programs/data (e.g., programs/data meant to be executed on the client 140) into microprograms/data that the portal device can properly interpret, as described herein. If the plug-in is not installed, the portal server 110 may automatically transmit and install it on the client 140 (at 625).

At 630, the portal server 110 (e.g., via the plug-in) determines whether the portal device is currently attached to the client 140. If the device 150 is attached then, in one embodiment, the portal server 110 will automatically log the user in. The portal server 110 may automatically authenticate the portal device 150 via a serial number and/or a user authentication key embedded/stored in the device 150. Once the user is logged in to the portal server, he/she can then transmit data to and from the portal device 150 as described herein.

If the device 150 is not attached, however, then the portal server 110 may implement a standard user name/password login procedure and/or may register the user (at 640). During the registration process the user may be asked to respond to a series of questions relating to his/her background (e.g., hobbies, education, career, etc). The portal server 110 may use this information to personalize the content collected and provided to the user and/or to target ads to the user based on the user's preferences. In addition, at this point the user may be provided with an opportunity to configure the portal server 110 to gather and manage specific information on behalf of the user (e.g., particular stocks, sports scores, news, etc) and/or to provide the user with access to certain online applications (e.g., email, electronic scheduling, etc) as described herein.

Online Programming Interface

Figure 7:
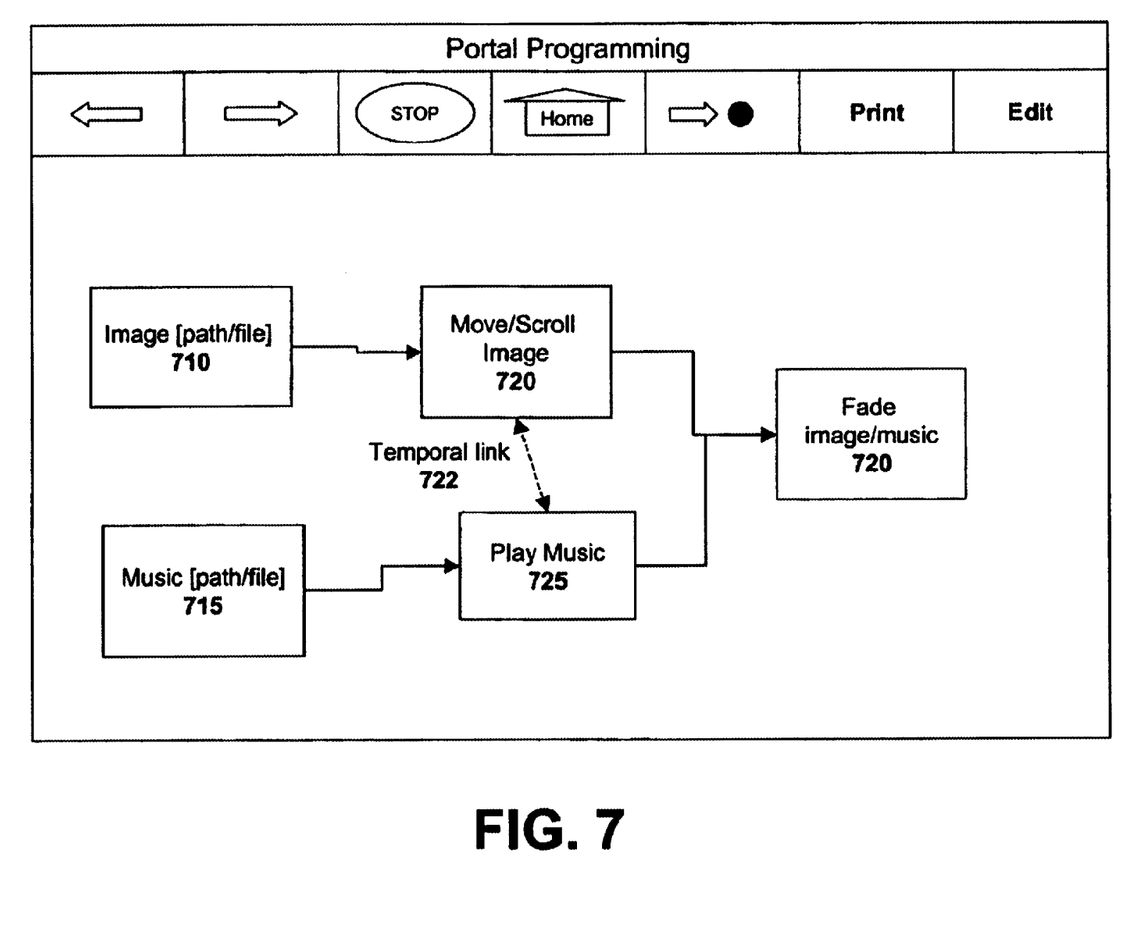
FIG. 7 illustrates a visual programming interface according to one embodiment of the invention.

In one embodiment, registered users are provided with an online visual programming interface such as that illustrated in FIG. 7. Under this embodiment users may construct their own microprograms to be executed on the portal device 150 and/or the client 140. For example, a user may define a programming block as a hyperlink which points to a particular piece of data or series of data (e.g., a current stock quote for AT&T, the San Francisco weather forecast, etc) and may also indicate how frequently the data associated with the hyperlink is to be updated. Multiple such blocks may be chained together to create a continual sequence of information to be displayed on the portal device 150 or the client 140. The particular programs generated by users may depend on whether a wireless portal device 150 is being used. For example, a microprogram designed to download up-to-date stock quotes may require a wireless connection to the portal server 110 to be effective.

As illustrated in FIG. 7, users may also program animation and/or sound into the portal device 150. For example, block 710 points to a particular image file (e.g., a bitmap file) and block 715 points to a particular music file (e.g., a Musical Instrument Digital Interface or "MIDI" file). The user may cause the image to move across the display 430 of the portal device 150 in a specified direction by programming block 720 (e.g., using X and Y coordinate data). Concurrently, the user may program block 725 to play the music track identified in block 715. Temporal link 722 indicates that the movement of the image and the playback of the music track are to take place simultaneously. Programming block 720 indicates that the music and image will both fade out to end the program.

In one embodiment, standard image and/or music files stored on the client 140 are converted to a format which the portal device can interpret (e.g., using a conversion module which may included in the client plug-in). For example, the melody line may be extracted from a MIDI file and transmitted to the portal device as a series of notes. Similarly, bitmap or JPEG images may be converted so that they are properly displayed on the portal device display 430, which in one embodiment is a black & white LCD display.

Portal Key Operations

In one embodiment, each portal device 150 includes a portal key which uniquely identifies the device, the user and/or particular data on the portal server. The key may either be permanently embedded in the device (e.g., the key may be the serial number) or, alternatively, may be selected manually by the user (e.g., the user's ID on the portal server 110) or may be assigned to the device by the portal server 110.

Figure 8:
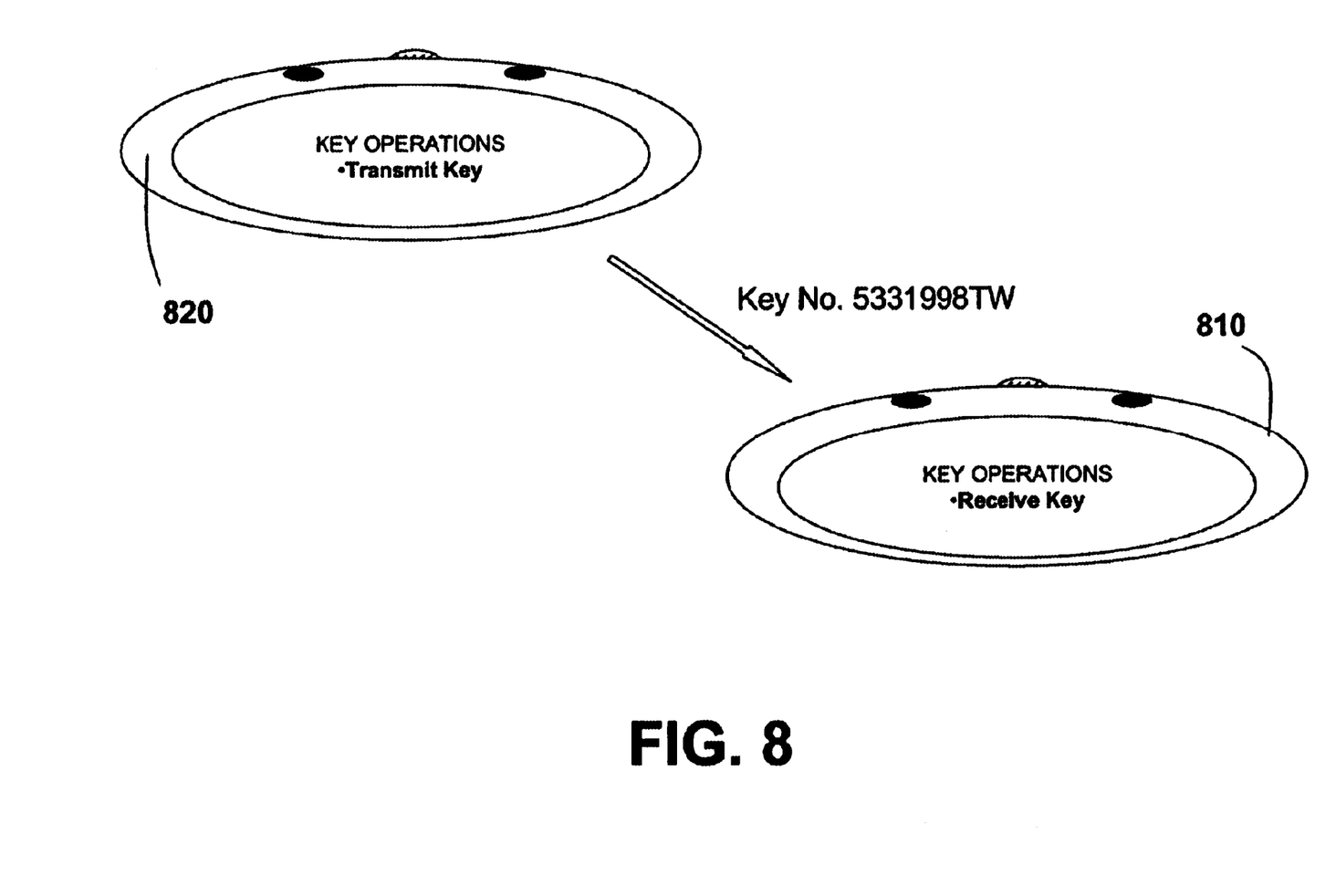
FIG. 8 illustrates portal device communication according to one embodiment of the invention.

Regardless of how the portal key is generated, as illustrated in FIG. 8, in one embodiment users may exchange keys between portal devices. Specifically, portal device 810 is shown receiving a portal key (key no. 5331998TW) from portal device 820. In one embodiment, when the user of portal device 810 connects to the portal server 110 after receiving the portal key, he/she will be provided with access to information and/or services associated with the portal key. For example, the user of portal key 820 may store personal and/or business-related information on the portal server 110 which he/she wants to share with the user of portal device 810.

Several portal key applications may be implemented using this type of portal key exchange. These include, for example, social invitations; "business card" exchanges (i.e., where the user of portal device 820 stores an online business card on portal server 110); personal photo exchanges; and/or exchanges of any other information adapted to be stored on a computer network. It should be noted, however, that the underlying principles of the invention are not limited to any particular type of informational exchange.

Exchanging portal keys in the foregoing manner provides an efficient mechanism for exchanging information using a limited amount of portal device memory because the underlying information is stored on the portal server 110, rather than the portal device 150 itself. In addition, when a user exchanges a key, the user is then free to continually update the information/services on the portal server 110 to which the key provides access. For example, a user may exchange a key with a prospective employer, and subsequently update his/her resume on the portal server 110. Similarly, if the user is involved in research, he/she may exchange his/her key with colleagues and continually update the research data on the portal server 110.

In one embodiment, a user may set up a number of different keys on the portal server, each pointing to a different type of information and/or service. The user can then select a particular key to transmit to a second user (e.g., using the portal device controls 440,441,450) depending on the information and/or service to be provided to the second user. For example, a user may establish a business key which points to business-oriented information/services (e.g., a firm brochure) and a personal key which points to personal information/services (e.g., personal photos). In one embodiment, the portal device 150 will include one standard key for generally identifying the portal device 150 to the portal server 110 and other users, and any number of user-defined "sub-keys" which can be used to exchanged more specific user data (e.g., such as the business data and personal data described above).

Various advertising and promotional services may be implemented in accordance with the underlying principles of the invention. In one embodiment, portal devices may be set up to broadcast keys to users at a place of business such as a supermarket or a car dealership. A user may choose to receive the key on his/her portal device and thereby acquire additional information about the product/service associated with the key when he/she logs in to the portal server 110. Businesses may offer various types of Internet promotions/discounts to users in this manner. Conversely, a user may choose to transmit his/her key to a portal device located at a business to request that the business automatically contact the user with additional product/service information (e.g., via email, a telephone call, etc).

In one embodiment, advertisements and/or coupons may be transmitted to the user's portal device 150. This may be accomplished over the client link 160 and/or the RF link 220. If transmitted over the client link 160, the ad/coupon may be programmed to trigger at a statistically effective time (one embodiment of the portal device 150 includes a digital clock). For example, a Starbucks® Coffee ad may be downloaded to the portal device 150 at a random time and may be programmed to trigger in the morning, before the user heads in to work. Personal information known about the user (e.g., the user's preferences, the user's daily schedule, etc) may be factored in to the timing decision and/or the decision as to which ads to transmit to the user. The ad/coupon may also be triggered automatically at any time/date via the RF link 220.

If a coupon is transmitted, the user may redeem the coupon in a number of ways. In one embodiment, the user may simply show the coupon code to an employee working at the business for which the coupon is valid. Alternatively, a portal device may be configured directly at the business to automatically redeem coupons (e.g., via a coupon exchange feature similar to the key exchange feature described above). The business' portal device may communicate with the portal server 110 to continually transmit and receive coupon data. In one embodiment, the user's portal device is configured to display a bar code identifying the received coupon/service which may be interpreted by a bar code device at the business to redeem the coupon/service. The underlying principles of the invention may be implemented using various additional advertisement and/or coupon redemption mechanisms.

In one embodiment, a coupon or advertisement may be transmitted to the user's portal device 150 from a portal device located at a business (in contrast to the embodiment above, where the coupon/advertisement is transmitted by the portal server 110). In this embodiment, the user's portal device 150 may automatically trigger the advertisement/coupon when it is brought within range of the business' portal device. In one embodiment, the business' portal device transmits a key to the user's portal device 150, which the user may subsequently use to obtain additional information from the portal server 110 (e.g., relating to a particular product or service). In this embodiment, the business' portal device may or may not communicate directly with the portal server 110.

It should be noted that the foregoing description of portal devices and associated methods includes various business methods. In addition, according to one particular business method, once a user registers on the portal server 110, the PO will assign a portal device 150 to the user free of charge (or for some nominal fee). Upon receipt of the portal device 150 (e.g., in the mail), the user will attach the portal device (e.g., via the client link 160), and register the portal device 150 with the portal server 110. The user may then configure the manner in which he/she will use the portal device 150 (e.g., by selecting the types of portal data/microprograms to be processed and stored in the device). In one embodiment, users will be given the option to upgrade to a more advanced portal device 150 for a specified fee. In one embodiment, however, the fee will be no more than the cost of manufacturing and shipping the device to the user.

In one embodiment, the portal device 150 is shipped to the user with pre-configured data and/or advertisements already stored within the device 150. This may include, for example, the user's name and address; scheduling data for the user for the day/week on which the user will receive the device; and/or any other data stored by the user on the portal server 110.

In one particular embodiment, the portal device 150 is configured to display shipping information (e.g., the shipping bar code and/or destination address) on its display 430. This shipping information may be used by the shipping company to transport the portal device 150 to the user. This embodiment may be shipped to the user using transparent packaging so that the shipping data may be easily read/scanned.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 110, alternative embodiments of the invention may include numerous different servers (e.g., database servers, web servers, etc), and/or mirrored servers distributed across a network. Accordingly, the scope and spirit of the invention should be judged in terms of the claims which follow.

What is claimed is:

1. A method comprising:

registering a user on a server, said registration process comprising identifying a first plurality of data to be maintained by said server on behalf of said user, and a second plurality of data to be maintained by one or more external servers and being retrievable from said external servers by said server on behalf of said user;

sending said user a data processing device, said data processing device comprising user-dependent pre-configured data;

converting portions of said second plurality of data to a set of bytecodes executable by an interpreter module configured on said data processing device; and transmitting a subset of said first plurality of data and said bytecodes representing said portions to said data processing device.

2. The method as in claim 1 wherein said subset of data are identified by said user logging in to said server from a client computer.

3. The method as in claim 1 wherein said second plurality of data includes an audio file and said server converts said audio file into bytecodes interpretable by said interpreter module for playback on said data processing device.

4. The method as in claim 1 wherein said second plurality of data includes an image file and said server converts said image file into bytecodes interpretable by said interpreter module for display on said data processing device.

5. The method as in claim 1 wherein said subset of said first plurality of data is transmitted periodically.

6. The method as in claim 1 wherein said first plurality of data to be maintained by said server on behalf of said user includes email data.

7. The method as in claim 1 wherein said first plurality of data to be maintained by said server on behalf of said user includes scheduling data.

8. The method as in claim 1 wherein said subset of said first plurality of data and said bytecodes representing said portions are transmitted over a wireless network.

9. The method as in claim 1 wherein said subset of said first plurality of data and said bytecodes representing said portions are processed by said interpreter module.

10. The method as in claim 1 further comprising compressing said subset of said first plurality of data using one or more data compression techniques.

* * * * *